May 1, 1945. J. J. SHIVELY ET AL 2,374,842
RECORDING AND REPRODUCING APPARATUS
Original Filed March 18, 1941 9 Sheets-Sheet 1

INVENTORS
John J. Shively
Harry R. Van Deventer
BY
Van Deventer & Green
ATTORNEYS

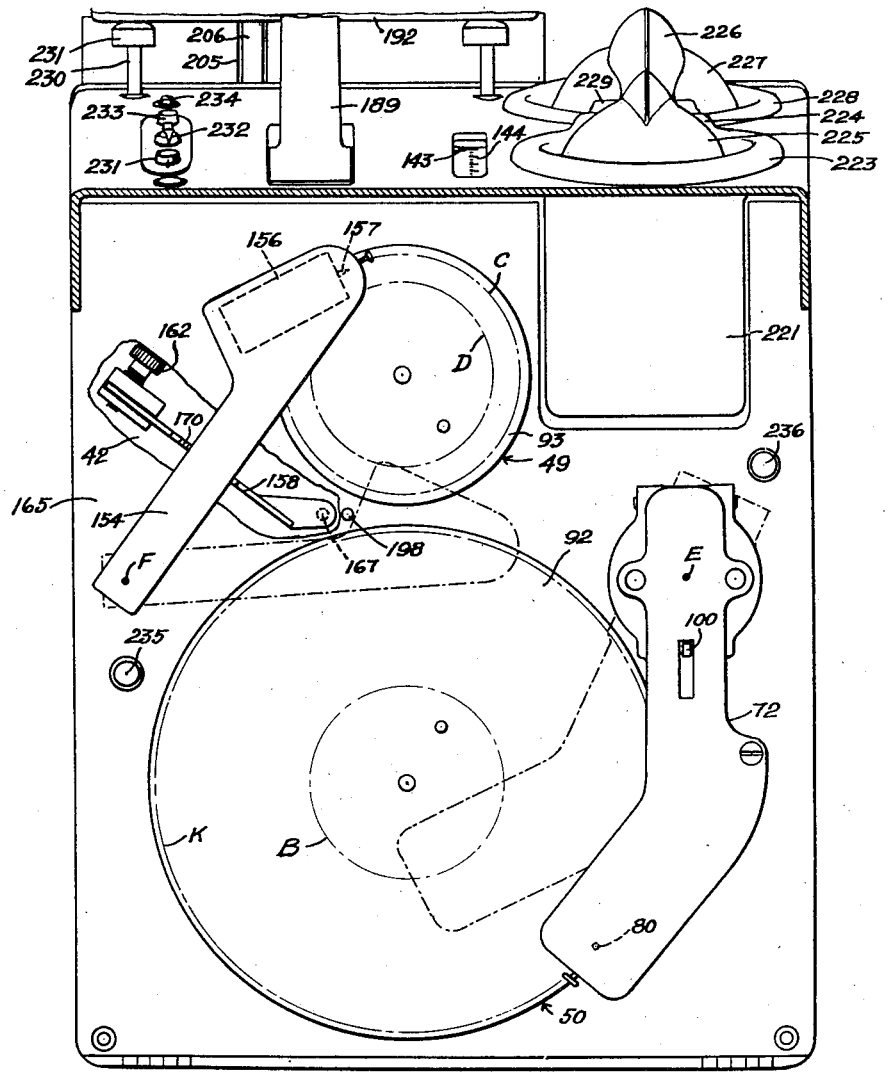
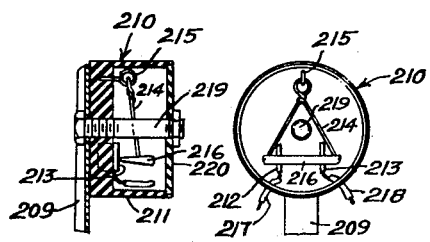
FIG. 3
FIG. 5    FIG. 4

May 1, 1945. J. J. SHIVELY ET AL 2,374,842
RECORDING AND REPRODUCING APPARATUS
Original Filed March 18, 1941 9 Sheets-Sheet 3

INVENTORS
John J. Shively
Harry R. Van Deventer
BY
Van Deventer & Grier
ATTORNEYS

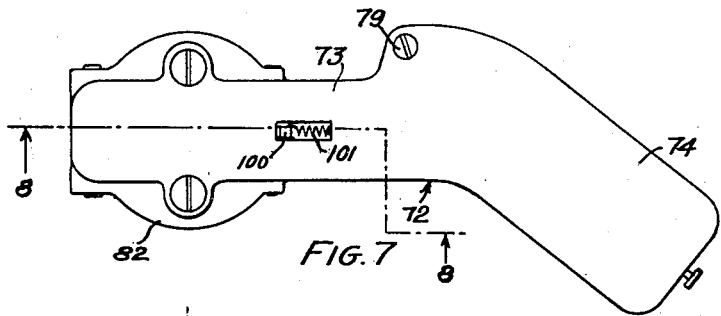
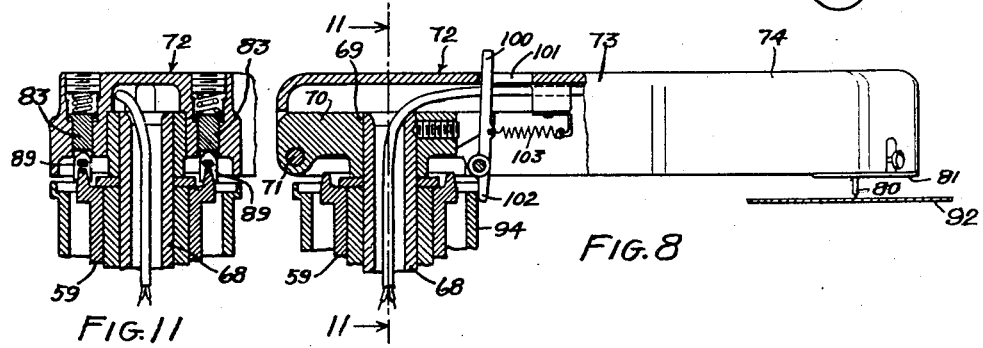
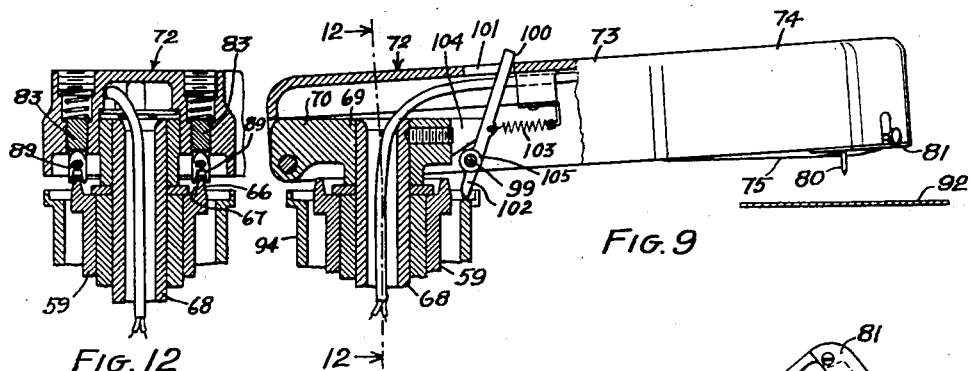
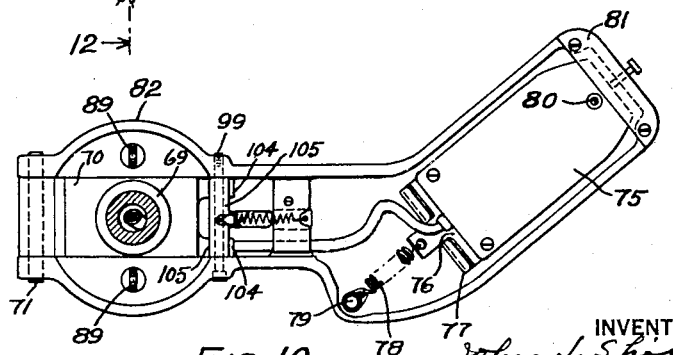

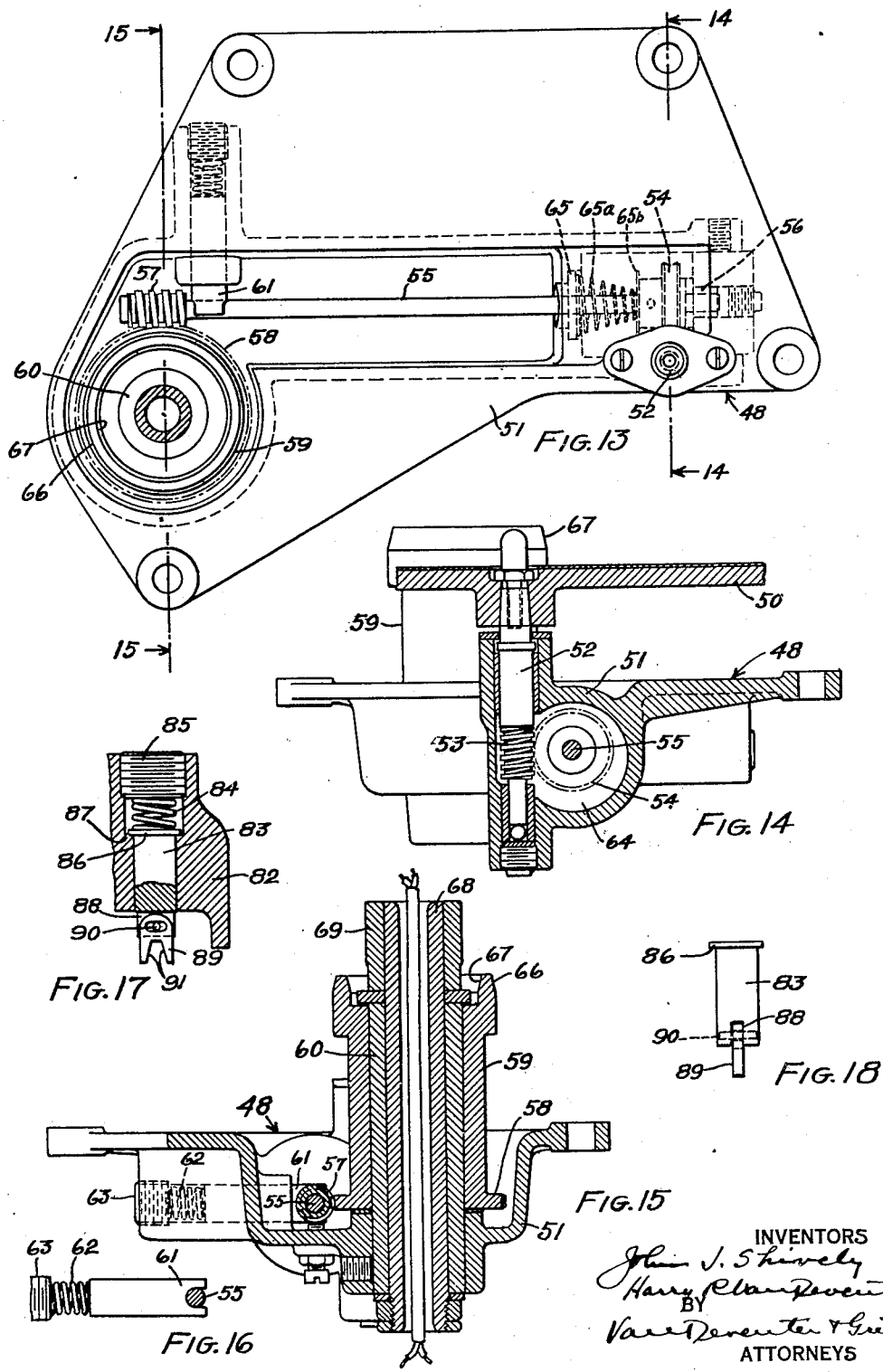

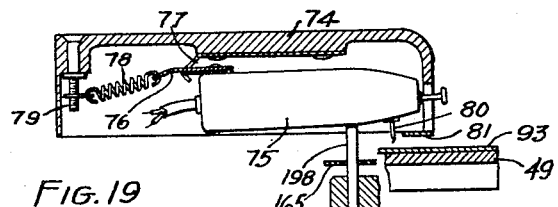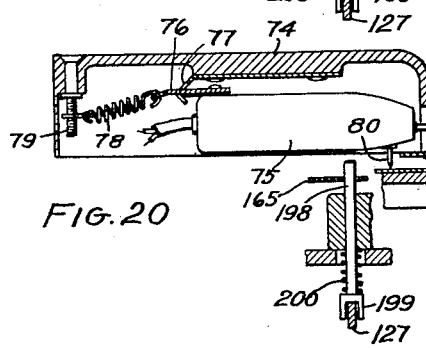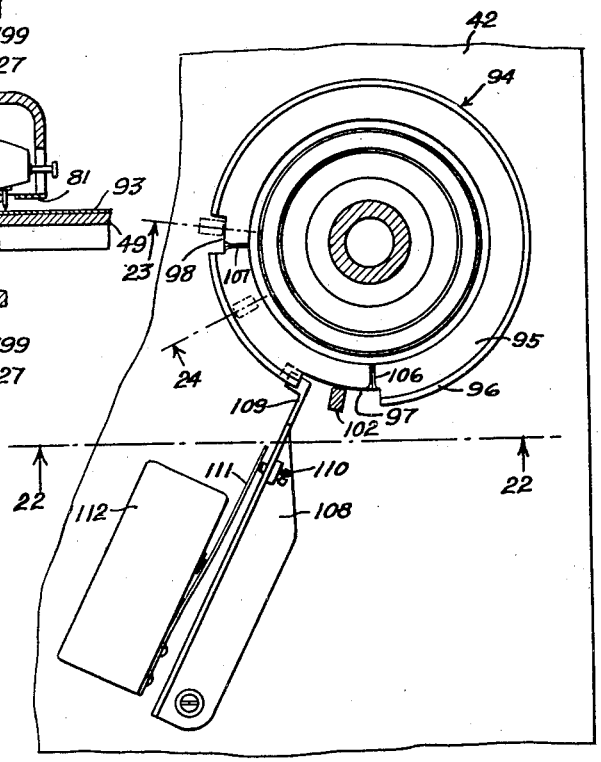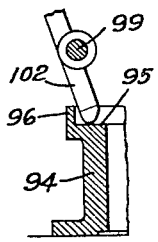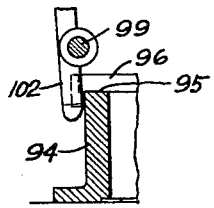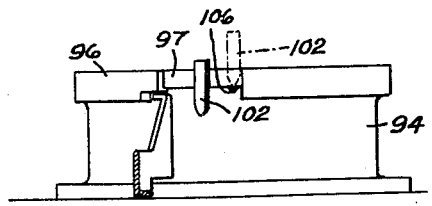

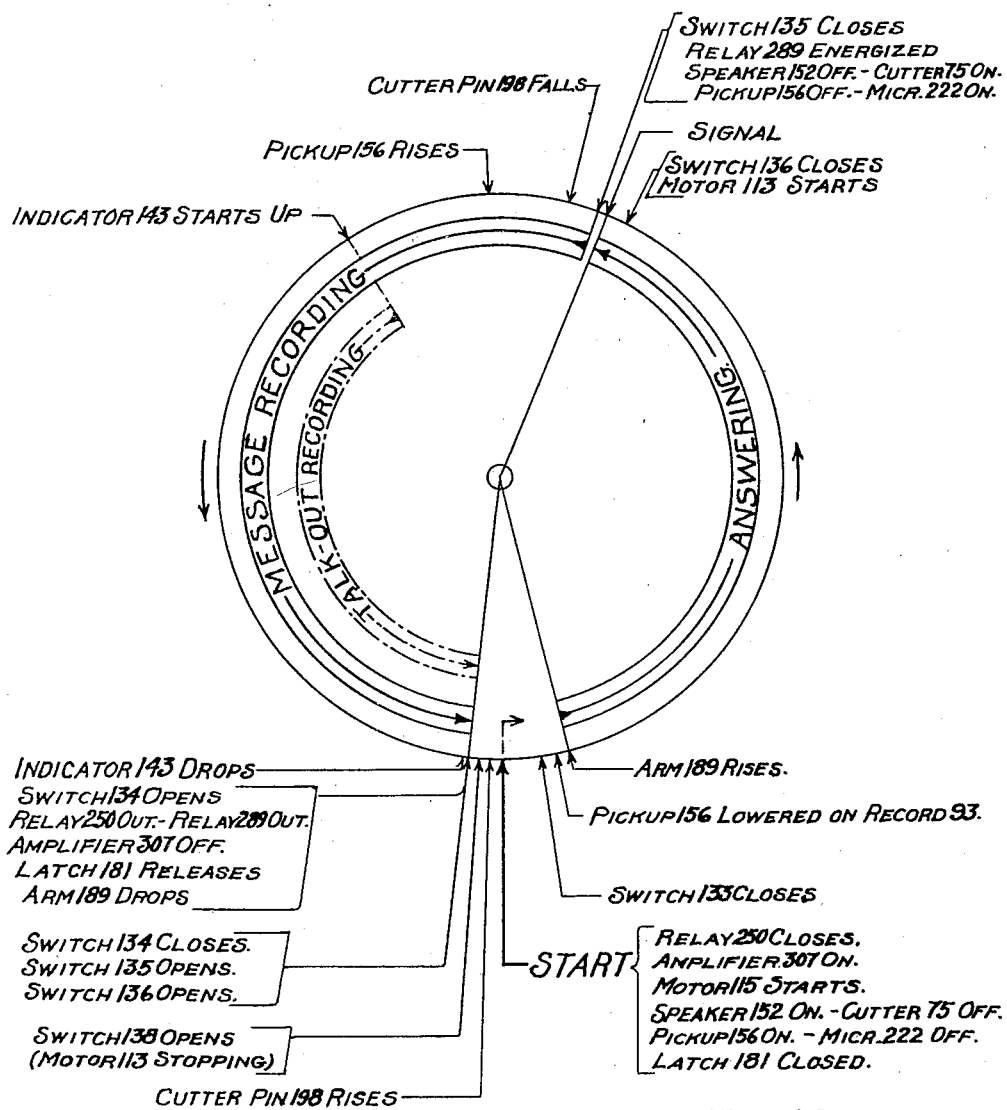
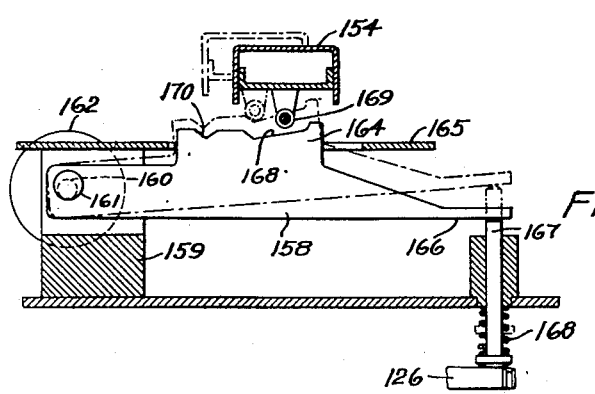
Fig. 28
Fig. 27

Patented May 1, 1945

2,374,842

UNITED STATES PATENT OFFICE 2,374,842

RECORDING AND REPRODUCING APPARATUS

John J. Shively and Harry R. Van Deventer, New York, N. Y., assignors to Telephone Answering and Recording Corporation, New York, N. Y., a corporation of Delaware Original application March 18, 1941, Serial No. 383,904. Divided and this application July 10, 1943, Serial No. 494,132

24 Claims. (Cl. 179—6)

This application is a division of our co-pending application entitled Recording and reproducing apparatus, filed March 18, 1941, Serial Number 333,904, which is a continuation in part of application Serial Number 333,268, filed May 4, 1940, now Patent No. 2,261,420, dated November 4, 1941.

The present invention includes new and improved structures for use in the types of recording and reproducing apparatus disclosed in the aforesaid patent and application and with other types thereof.

An object of the invention is to provide improved means for recording on blank record discs.

A further object is to provide means of the above type adapted to record on a plurality of turntables in the same plane.

Another object is to provide improved feeding means for the recording head.

Another object is to provide recording and reproducing apparatus including a plurailty of turntables in the same plane, a single recorder head and a single reproducer head, both heads being cooperative with all turntables.

Another object is to provide improved control means for the recording and reproducing means.

A further object is to provide telephone answering and recording apparatus including the above and other disclosed improvements.

Other objects and advantages of the invention will appear during the course of the following description in connection with the accompanying drawings, in which Figure 1 is a longitudinal partial sectional view of a telephone answering and recording device embodying the invention;

Figure 3 is a top view of the device, Figure 1, showing the apparatus in normal recording position;

Figure 4 is a front view of the detector with the cover removed;

Figure 5 is a vertical sectional view of the same, taken on the line 5—5 of Figure 4;

Figure 7 is a detail top view of the recorder arm;

Figure 8 is a longitudinal view of the same partly in section along the lines 8—8, Figure 7, showing the recorder in engaged position with the record;

Figure 9 is a similar view in disengaged position;

Figure 10 is a bottom view of the recorder arm and head;

Figure 11 is a vertical sectional view on the lines 11—11, Figure 8;

Figure 12 is a similar view on the lines 12—12, Figure 9;

Figure 13 is a plan view of the feeding mechanism;

Figure 14 is a cross sectional view of the same on the lines 14—14, Figure 13;

Figure 15 is a cross sectional view on the lines 15—15, Figure 13;

Figure 16 is a detail view of the spring-pressed jack-shaft bearing;

Figure 17 is an enlarged fragmental detail view of a feeding fork and spring;

Figure 18 is another view of the feed fork;

Figure 19 is a detail view of the cutter or recording head and automatic lifter therefor in lifted position;

Figure 20 is a similar view in lowered position;

Figure 21 is a vertical detail view of the interlocking guard means and limit switch;

Figure 22 is a view of the same in the plane 22—22, Figure 19;

Figure 23 is a fragmental view of the guard ring and latch in released position;

Figure 24 is a similar view in latched position;

Figure 27 is a detail rear view of the reproducer control apparatus;

Figure 28 is a timing diagram of the answering and recording cycle, and

Figures 1, 2:
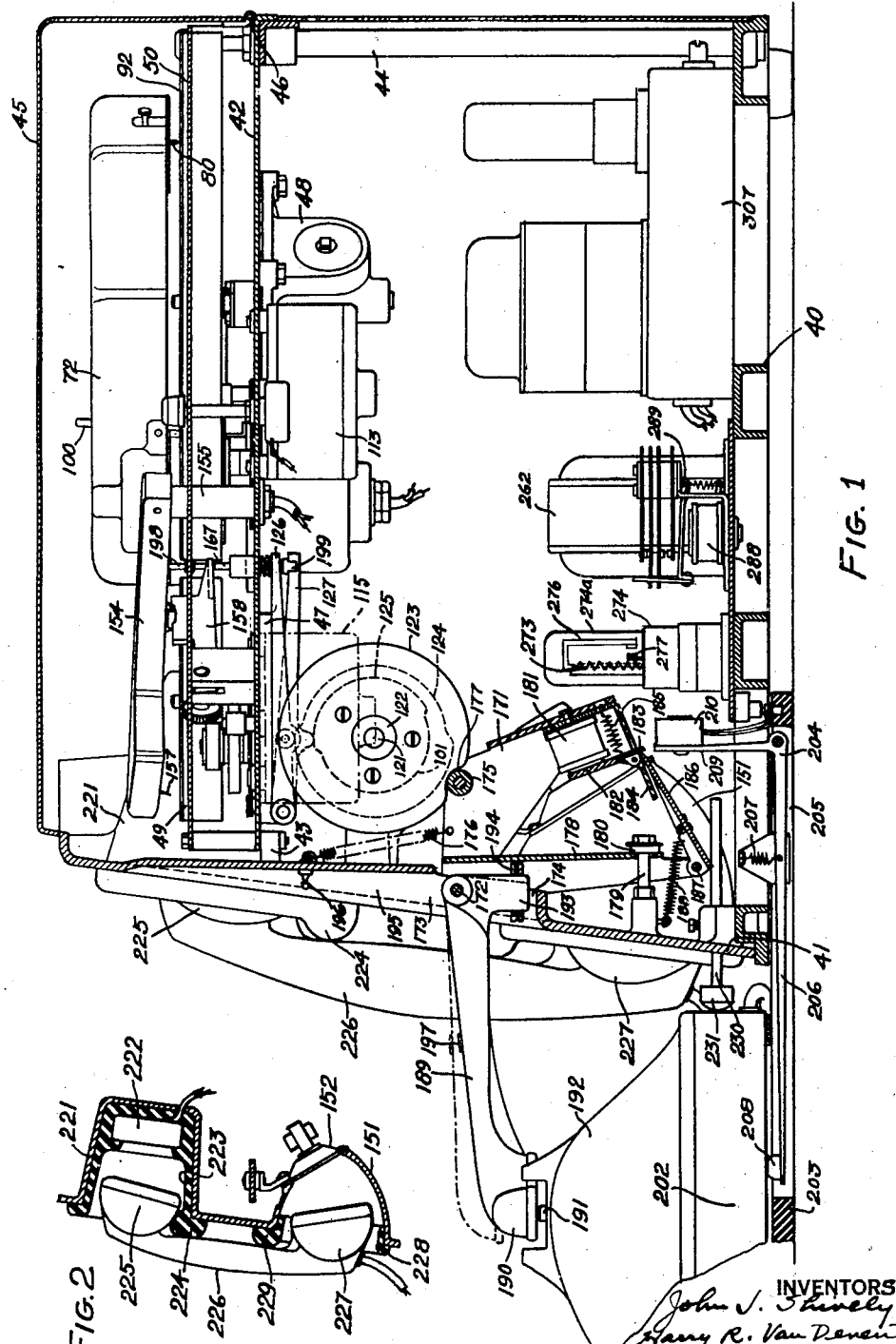
Figure 2 is a detail vertical section illustrating the means for positioning the telephone handset.

Referring to Figure 1, the numeral 40 indicates a base to which is secured an inclined front plate 41. A main top plate 42 is secured at the front to lugs 43 on the front plate 41 and at the rear to suitable posts 44 mounted on the base 40. A lid 45 is hinged at 46 to the rear of the top plate 42.

Figure 6:
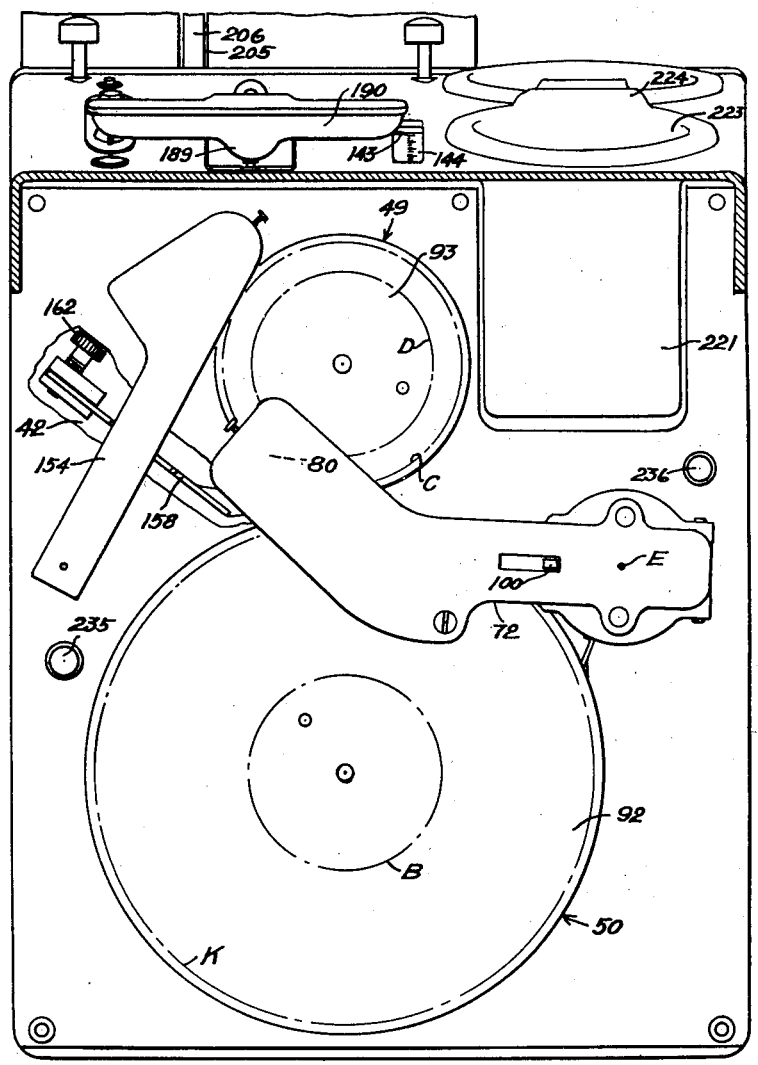
Figure 6 is a top view similar to Figure 3 but showing the apparatus positioned for recording talk-out or answering speeches.

The numeral 47 generally denotes an answering and control unit, while numeral 48 similarly denotes a recording unit, both units being secured to the top plate 42. The recorder unit 48 and the answering unit 47 carry turntables 50 and 49 respectively, these turntables being disposed in the same horizontal plane and preferably in alignment longitudinally of the plate 42 as shown in Figures 3 and 6.

Recording unit

Referring to Figures 13, 14 and 15, the recording unit 48 has a body or frame 51 in which is vertically journalled the shaft 52 carrying the turntable 50. A worm 53 on the shaft 52 is in mesh with a worm gear 54 mounted on a horizontal jack shaft 55 freely journalled in a bushing 56 in the frame 51, the bushing 56 also being adapted to absorb end thrust.

A second worm 57 on the jack-shaft 55 meshes with a second worm gear 58 on a feed hub 59, the latter being rotatably mounted on a vertical sleeve 60 secured in the frame 51.

The jack-shaft 55 is supported adjacent the second worm 57 in a saddle bearing 61 horizontally slidable in the frame 51 and backed by a compression spring 62 which in turn is adjustably backed by a set screw 63 as shown in detail in Figures 15 and 16. By this means the worm 57 is resiliently pressed into complete mesh with the worm-gear 58, eliminating any possible back-lash or lost motion between these members and providing for automatic take-up of any wear which may occur during the life of the machine. The bushing 56 is sufficiently free to prevent any cramping of the shaft 55 due to the above automatic take-up. The worm 57 and gear 58 are lubricated with a suitably adherent grease, and due to the low speeds of these parts and the light load transmitted thereby as hereinafter set forth, the friction load caused by the pressure meshing of the worm and gear is so small as to be negligible. The frame or body 51 forms a casing about the first worm gear 54, providing a reservoir 64 to hold lubricant for this gear, its worm 53 and the shaft 52. A spring-pressed sealing washer 65, Figure 13, prevents escape of lubricant from the reservoir 64. The spring 65$^a$ which presses the washer 65 reacts against a thrust washer 65$^b$ on the shaft 55, thus maintaining the latter under thrust in one direction at all times and thereby eliminating possible endwise back-lash or lost motion of the jack-shaft.

The upper end of the feed hub 59 is formed annularly with external and internal tapers 66 and 67.

A hollow swivel shaft 68 is rotatably mounted in the stationary sleeve 60. A swivel head 69, shown in detail in Figures 8, 9 and 10, is secured to the top of the shaft 68, and includes a rearward extension 70. Horizontally pivoted at 71 to the extension 70 is a cutter arm 72 having a straight portion 73 and an angularly directed forward portion 74. A recording head or cutter 75 is mounted in the forward arm portion 74 so as to have limited floating motion upward and downward. This floating mounting of the cutter 75 may be by any suitable means, illustrated herein as shown in Figures 10, 19 and 20 by a knife-edge member 76 held in engagement with a V-bracket 77 by a strong tension spring 78. The rear end of the spring 78 is adjustable upward or downward on a screw 79, thus providing an adjustable counterbalance for a portion of the weight of the cutter 75 and thereby allowing for adjustment of the depth of recording cut.

The cutter 75 is provided with the usual stylus 80. A plate 81 serves to limit the possible downward swing of the cutter 75 and supports the latter when the arm is raised to disengaged position.

The circular or hub portion 82 of the cutter 75 arm 72 has closely slidable therein a pair of small vertical plungers 83, shown in enlarged detail in Figures 17 and 18. Springs 84 backed by screws 85 urge the plungers 83 downward, the downward possible motion being limited by heads 86 engaging shoulders 87 in the arm portion 82. Transverse slots 88 in the lower ends of the plungers 83 have closely fitted therein flat forks 89, the latter being retained and allowed limited transverse floating motion by pins 90.

The forks 89 overlie the annular top of the feed hub 59, the internal tapers 91 of the forks corresponding substantially to the external and internal hub tapers 66 and 67. When the arm 72 is tipped upward in idle position, as shown in Figures 9 and 12, the forks 89 are held clear of the hub tapers. However, when the arm 72 is lowered into horizontal position on the swivel head 69 as shown in Figures 8 and 11, the forks 89, pressed by the springs backed by the weight of the arm, engage and wedge on the tapers 66 and 67.

It is evident that whenever the turntable shaft 52 is rotated, the feed hub 59 is also rotated at greatly reduced speed through the previously described compound worm-gear train. Therefore, when the arm 72 is lowered to bring the stylus 80 into engagement with a record blank 92, and the hub 59 is revolved as noted, the forks 89 gripping the tapers 66 and 67 cause the arm 72 to be swung at the same rotative speed as the hub, thus feeding the stylus 80 across the record.

Due to the steepness of the tapers 66 and 67, the weight of the arm 72 and strength of springs 84, the grip of the forks 89 on the hub 59 provides a substantially rigid connection therewith, and this positive grip, together with the prevention of lost motion as previously set forth, causes the stylus 80 to cut threads with highly accurate uniform spacing.

It will be noted that the forks 89 are adapted to engage the hub 59 at any points on the latter's circumference, so that feed can be started exactly at any desired point without the necessity of attempting to mesh teeth and threads as in the case of recorders employing lead screws or the like. It is also evident that the structure is adapted to permit the cutter to be fed at any desired sector throughout the entire 360° of swing of the swivel shaft 68. This permits the single cutter to be operated in conjunction with a plurality of turntables in the same plane, as illustrated in Figures 3 and 6 by turntables 50 and 49 in the present embodiment.

In Figure 6 the apparatus is illustrated as located to record throughout a zone K—B on the record blank 92 on table 50, while in Figure 6 the cutter is swung to record throughout a zone C—D on a blank 93 on the table 49, the axis E of the feed mechanism being equidistant from the axes of both turntables.

While, as previously pointed out, the feed hub 59 and forks 89 are adapted to engage and cause feeding at any horizontal angle, in each particular case it is desirable to restrict such engagement to the particular zones wherein recording is to be made, represented in the present embodiment by the zones K—B and C—D. For this purpose, the following provision is made:

A cylindrical guard or ring 94, shown in Figures 8, 9, 11, 12, 21, 22, 23 and 24, is secured to the main plate 42 and surrounds the feed hub 59. The ring 94 has an annular top surface 95 provided with an outer upwardly extending rim 96 which is interrupted by cut-out notches 97 and 98 as shown most clearly in Figures 21 and 22.

A cross pin 99 in the arm 72, Figures 8, 9 and 10, has rockably mounted thereon a trigger lever 100 extending upward through a slot 101 in the straight portion 73 of the arm. The bottom of the trigger 100 comprises a small latch 102. A tension spring 103 urges the trigger 100 clockwise so that when the arm 72 is raised as in Figure 8 the latch 102 normally rests on the annular guard surface 95, as shown in Figures 9 and 24, thus preventing the arm from falling.

Stops 104 on the swivel head 69 are adapted to engage hubs 105 on the trigger 100, thus preventing the arm 72 from being raised high enough to bring the latch 102 above the rim 96.

When the latch 102 is in upper position, therefore, as shown in Figures 9 and 24, it may ride around the surface 95 and allow the arm 72 to be swung to any position, but the rim 96 prevents the latch 102 from being swung outward except when the latter is in registry with notch 97 or notch 98. When in such registry, the latch may be swung outward as shown in Figures 8 and 23, allowing the arm 72 to be lowered to bring the stylus 80 into engagement with the record blank 92.

The notches 97 and 98 thus define the zones of recording within which the stylus 80 may be lowered on the record blanks, namely zones K—B and C—D.

The arm 74 must be raised in order to swing the recorder through or into any other positions, and in such other positions the latch 102 cannot be released.

The above provision prevents injury to the records, stylus or cutter by careless lowering of the latter in improper positions. Furthermore, when the arm 72 is raised after recording, the spring 103 instantly snaps the latch into position on the surface 95, preventing the cutter stylus 80 from being violently dropped on the record if the arm is accidentally released.

Referring to Figure 22, it will be seen that the point of the latch 102 is wedge-shaped. A radial groove 106 is provided in the surface 95 adjacent the counter-clockwise end of the notch 97, the notch 98 being provided with a similar groove 107.

When it is desired to set the device for recording on a fresh record blank 92, the arm 72 is swung until the wedge point of the latch 102 engages the groove 106, which thereby positions the arm with the stylus 80 above the outer boundary K of the zone K—B. Releasing the latch thereupon brings the stylus into engagement with the record on the line K, from which boundary the cutter is then fed inward as recording proceeds. Similarly the groove 107 automatically defines the starting position of the arm 72 for recording in the zone C—D, no skill or careful setting being required of the operator in either case.

A small lever 108, Figures 21, 22 and 6, is pivoted to the plate 42 under the turntable 50 and has an upward extension 109 underlying the groove 97 adjacent the clockwise end thereof. An adjustable screw 110 in the lever 108 engages the resilient arm 111 of a normally closed limit switch 112 of any suitable type, herein illustrated as the type known commercially as a microswitch. When the recorder stylus 80 approaches the inner boundary B of the zone K—B, the latch 102 engages the lever extension 109, swinging the lever 108 and opening the switch 112. The connections of the limit switch will be set forth hereafter in the explanation of the wiring diagram, Figure 29.

A motor 113, Figure 1, is provided to drive the turntable 50 and shaft 52 through any suitable rim-drive mechanism, such mechanisms being well known in the art and therefore requiring no further description herein.

*Answering and control unit*

Figures 25, 26:
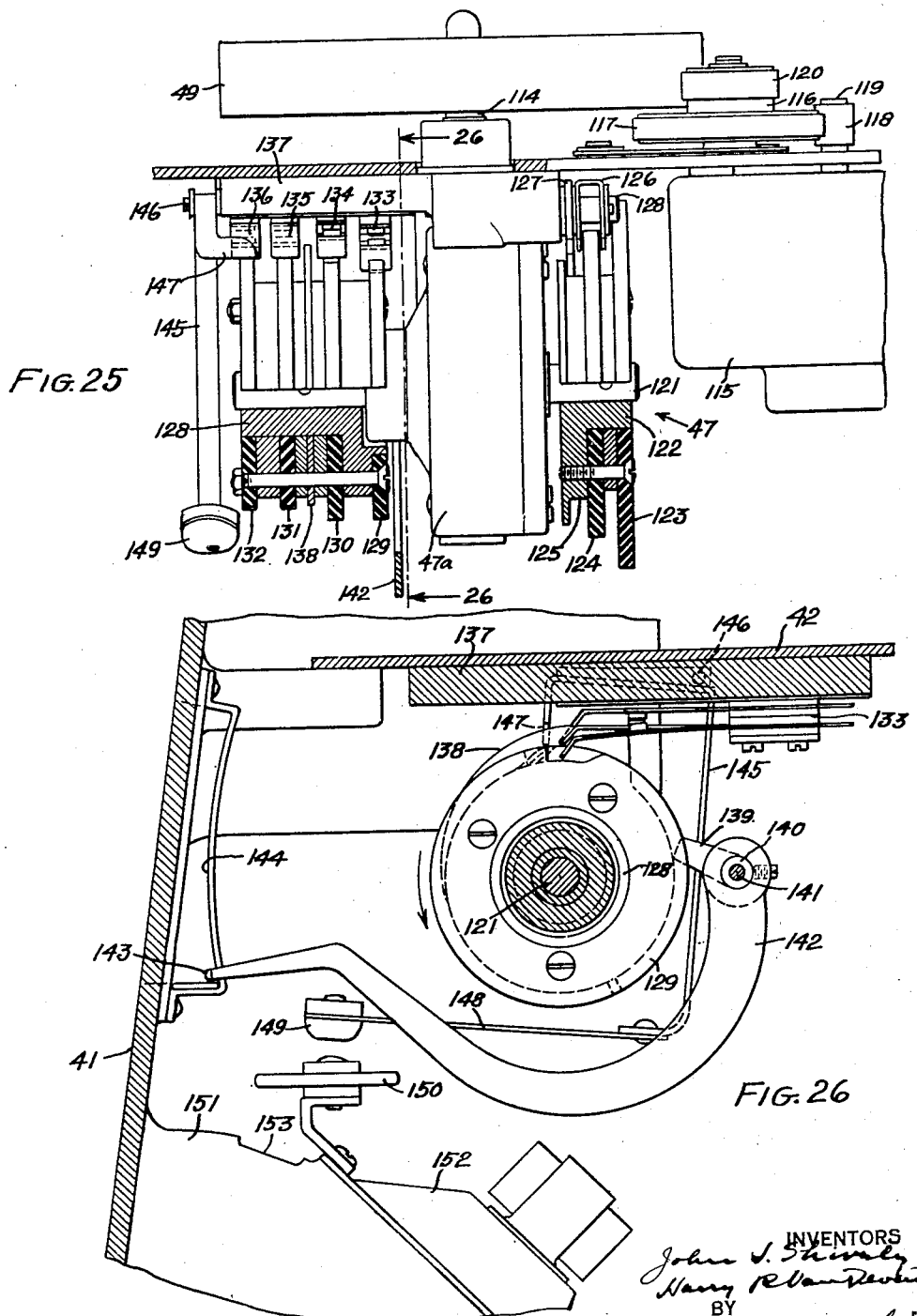
Figure 25 is a front view, partially in section, of the answering turntable drive and control unit.
Figure 26 is a sectional view of the same on the lines 26—26, Figure 25.

Referring to Figures 25 and 26, the control unit 47 has a vertical shaft 114 carrying the turntable 49, which in the present embodiment is of smaller diameter than the turntable 50 as shown in Figures 1, 3 and 6. A second motor 115, similar in speed to motor 113, is adapted to rim drive the turntable 49 and shaft 114 through a floating roller 116, this motor being shown in phantom outline in Figure 1 in order to more clearly disclose the mechanism behind it. The roller 116 has a resilient tire 117 of comparatively large diameter engaging a pulley 118 on the motor shaft 119, and a second resilient tire 120 of smaller diameter engaging the periphery of the turntable 49. The drive through the roller 116 from the motor 115 to the turntable 49 thus effects a speed reduction which causes the small turntable 49 to be driven at substantially the same speed as the large turntable 50.

A transverse cam shaft 121 is adapted to be driven at reduced speed from the turntable shaft 114 through suitable worm gearing disposed in a casing 47a.

A hub 122, secured to the cam shaft 121, carries cams 123 and 124, and a third cam 125 is formed on the flange of the hub 122 itself. A pair of horizontal levers 126 and 127, pivoted on a pin 188, engage cams 124 and 125 respectively. The above noted cams and levers are further illustrated in Figure 1, and their operations and functions will be hereinafter explained.

A second hub 128 is secured to the opposite portion of the shaft 121, and carries four switch cams 129, 130, 131 and 132, preferably of non-conducting material such as linen Bakelite. Cams 129, 130, 131 and 132 respectively engage and are adapted to control switches 133, 134, 135 and 136 secured to the bottom of the body 137 of the unit 47. The four switch cams and corresponding switches are further illustrated on the electrical diagram, Figure 29, and their operation and functions will also be fully set forth hereinafter in explaining the general operation of the machine.

The hub 128 also carries a thin metal cam 138, hereinafter referred to as the indicator cam. A short tappet 139, secured to a hub 140 pivoted on a stationary pin 141, engages the cam 138. A curved arm 142, secured to the hub 140, terminates in a pointer 143 adapted to cooperate with an arcuate scale 144 secured to the front plate 41. The cam 138 is so shaped that during a certain portion of its revolution, as set forth hereinafter in connection with the timing diagram, Figure 28, it swings the tappet 139 and arm 142 clockwise at uniform speed, causing the pointer 143 to travel up the scale 144 and indicate time intervals thereon, the time graduations of the scale 144 being illustrated in Figures 3 and 6.

Figure 29:
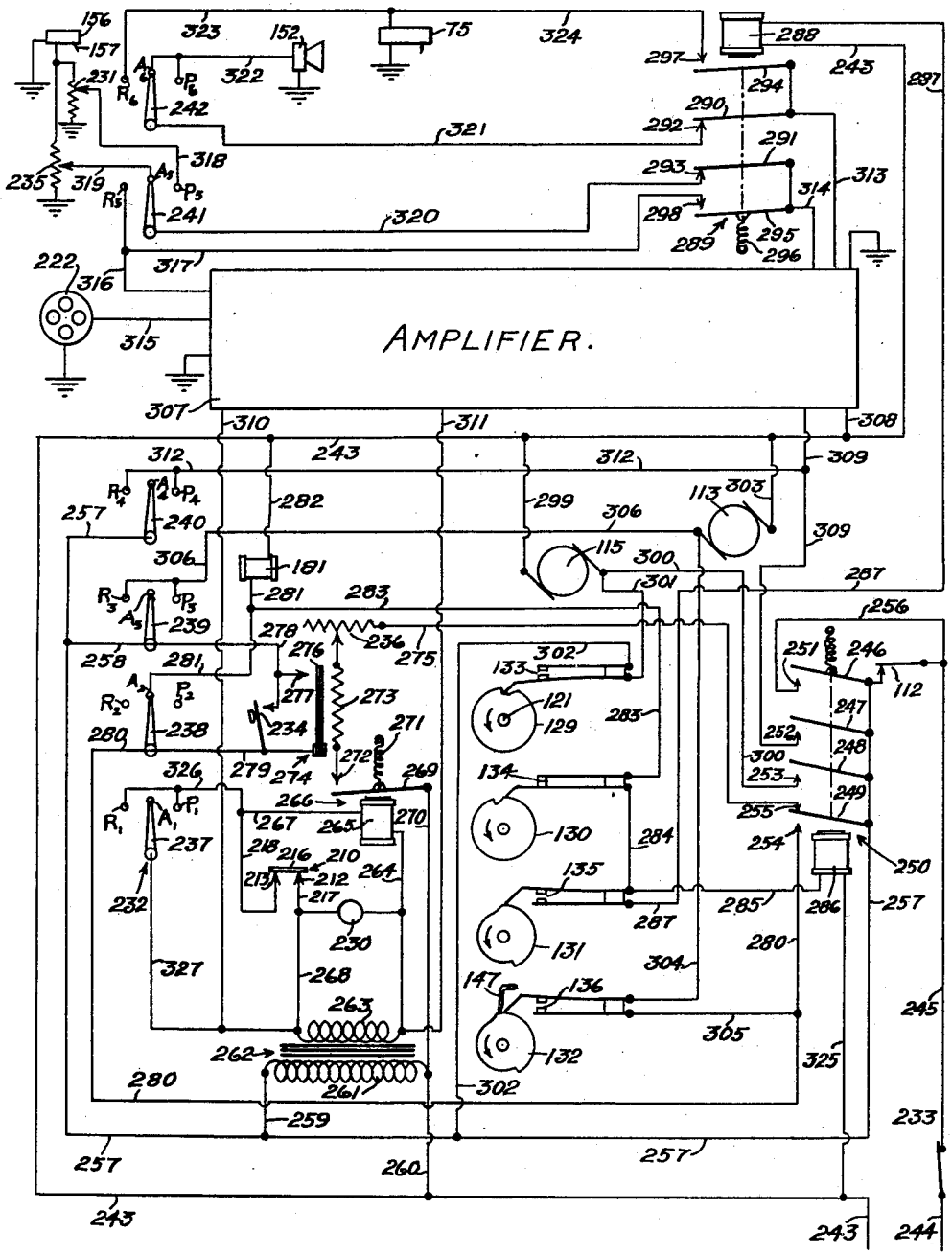
Figure 29 is a circuit diagram of the apparatus.

An angular lever member 145 pivoted at 146 to the body 137 has a toe 147 engaging the cam 132 adjacent the switch 136, this toe also being illustrated in Figure 29. A resilient arm 148, attached to the lower end of the member 145, carries a clapper 149 normally overhanging a gong bar 150 of resounding metal, the latter being resiliently mounted on a housing 151 to which is also attached a loud speaker 152. When the cam 132 allows the toe 147 to drop, the clapper 149 strikes the gong-bar 150 and rebounds therefrom, thus sounding a signal note for purposes hereinafter set forth. An opening 153 may be provided in the housing 151 to facilitate entry of the signal note to the interior thereof.

Reproducing apparatus

Referring to Figures 1, 3 and 6, a reproducer arm 154 is mounted on the usual swivel 155 secured to the main top plate 42, the arm carrying the usual pick-up 156 holding a needle 157, Figure 1. The vertical axis F of the swivel 155 is equidistant from the axes of both turntables 49 and 50, and the reproducer is adapted to be swung into position to engage either record as illustrated in Figure 3.

When the reproducer is in position to cooperate with the turntable 49, the arm 154 overlies a shifter arm 158, shown in detail in Figures 3, 6 and 27.

A support 159, secured to the plate 42, has journalled therein a small shaft 160, the latter carrying a small eccentric 161 serving as a pivot for the arm 158, Figure 27. A knurled knob 162 is secured on the end of the shaft 160, a spring friction washer 163 being provided between the hub of knob 162 and the support 159.

An upward extension 164 is formed on the arm 158. A dust shield or guard plate 165 is secured above the main top plate 42 just below the upper level of the turntables 49 and 50. The shield 165 is broken away in Figures 3 and 6 to show the shifter mechanism, but it will be understood that of the latter only the extension 164 and the top of knob 162 protrude upward through suitable slots in the shield, as shown in Figures 1 and 27.

A foot 166 on the lever 158 engages the top of a vertically slidable pin 167 urged downward by a spring 167ª against the lever 126. When the cam 124 revolves, Figure 1, causing the lever 126 to rise and fall, the latter acts through the pin 167 to raise the shifter arm 158 to upper position or allow it to fall to lower position, as illustrated in Figure 27.

The top of the extension 164 contains a wide inclined notch 168. The reproducer arm 154 is provided with a small longitudinal roller 169 adapted to engage the notch 168. When the arm 158 is in upper position, as shown in dotted and dashed lines, Figure 27, and in Figure 1, the arm 154 is elevated to hold the pick-up needle 157 clear of the record 93, the roller 169 resting by gravity in the lowest point of the notch 168. When the arm 158 is lowered, the pick-up needle, guided by the roller in the bottom of the notch 168, is lowered into engagement with the recordings at the outer or starting boundary C of the zone C—D on record 93. The exact line of this engagement may be adjusted for any desired purpose, as hereinafter set forth, by turning the knob 162, thus moving the eccentric pivot 161 and shifting the entire arm 158 inward or outward.

While the reproducer is traversing the recorded zone on the record 93, swinging to the right in the process, the roller 169 moves across and clear of the notch 168. At the completion of reproduction, when the arm 158 is again raised, the inclined side of the notch engages the roller 169 and raises the reproducer from the record, the roller then rolling down again to the bottom of the notch to restore the arm 154 to starting position by gravity.

A second notch 170 is provided in the top of extension 164 to receive and retain the roller 169 when the reproducer is swung clear of the turntable 49 during recording on the latter, a position illustrated in Figure 6.

Telephone control apparatus

Referring to Figure 1, a forked lever 171 is pivoted on a pin 172 which is supported in the walls 173 of an opening 174 in the front plate 41. The lever 171 carries a roller 175 and is urged upward by a spring 176, the roller 175 engaging the cam 123 and normally resting in a notch 177 therein.

A second forked lever 178, also pivoted on the pin 172, is allowed limited swinging motion by a stop pin 179 secured in the front plate 41 and provided with a resilient bumper 180.

The second lever 178 and the cam lever 171 are adapted to be operatively connected by a magnetic latch of the general type and purpose set forth in the previously noted U. S. Patent No. 2,261,420, dated November 4, 1941. In the present embodiment the magnetic latch comprises an electro-magnet 181 secured to the lower end of the cam lever 171 and cooperative with an armature 182. The armature 182 is horizontally pivoted to a lower rail 184 and has a short extension or detent 183 extending below the rail. A light spring 185 normally holds the armature 182 against the magnet 181. A latch finger 186 is pivoted at 187 to the lower end of the second lever 178. A light spring 188 presses the end of the finger 186 against the bottom of the rail 184 and also serves to urge the lever 178 forward— that is, clockwise in Figure 1.

A phone control arm 189, pivoted on the pin 172 and extending outward from the opening 174, has a weighted end portion 190 adapted to rest upon and normally depress the cradle switch 191 of a telephone instrument 192, the latter instrument being properly placed in front of the front plate 41. A downwardly extending lug 193 on the arm 189 has threaded therethrough a screw 194 engaging the second lever 178, and the weight of the control arm 189, in addition to holding the phone switch 191 depressed, also overcomes the spring 178 to hold the tip of the finger 186 just ahead of the latch detent 185, as shown in Figure 1.

The latch magnet 181 having been energized to retain its armature 182, when the cam 123 is revolved the roller 176 is forced downward, swinging the lever 171 and latch assembly clockwise. The finger 186 is engaged by the detent 183, causing the second lever 178 also to swing forward and the latter, acting through the screw 194, elevates the arm 189 to release the phone switch 191 as illustrated in dot-and-dash line, Figure 1.

When the magnet 181 is de-energized, either by failure of current or when approaching completion of the machine's cycle as hereinafter set forth, the armature 182 is released, the weight of the control arm 189 acting through the finger 186 to force the detent 183 counter-clockwise. The finger 186 thus over-rides the detent 183 and allows the arm 189 to drop and again depress the phone switch 191.

After release of the latch as above described, when the cam 123 completes its revolution the roller 175 again enters the notch 177 and the lever 171 swings backward to withdraw the detent 188 to initial position behind the end of the finger 186 as shown in Figure 1, the apparatus being thereby conditioned for the next operation.

By adjustment of the screw 194 the arm 189 may be adjusted to various heights of telephone instrument.

When not in use, the control arm 189 may be swung upward partially into a pocket 195 in the front plate 41, a button 196 and snap socket member 197 being provided to retain the arm in idle or completely raised position.

*Cutter control apparatus*

Adjacent the pick-up lift pin 167 previously described, Figures 1 and 3, is a second vertically slidable pin 198 shown in detail in Figures 19 and 20. The lower forked end 199 of the pin 198 straddles and engages the end of the cam lever 127, a spring 200 being provided to assure constant engagement.

Referring to the cam 125, Figure 1, it will be seen that this cam normally holds the lever 127 and consequently the pin 198 in an elevated position, but during a portion of the cam's revolution a zone 201 of smaller radius on the cam permits the lever 127 and pin 198 to drop to and occupy a lower position.

When the recorder arm 172 is swung into position for recording on the small blank 93 on turntable 49, as illustrated in Figure 6, and the arm 72 is lowered by tripping the trigger 100, the top of pin 198 engages the cutter head 75 as shown in Figure 19, thus holding the stylus 80 clear of the blank 93. During the previously mentioned portion of the cycle, when the pin 198 is lowered to the position shown in Figure 20, the cutter head 75 is also lowered, allowing the stylus 80 to engage the blank 93 and effect recordings thereon. At the conclusion of recording, the pin 198 and cutter 75 are again raised to initial position, Figure 19. The exact timing and purpose of these provisions will be set forth fully in the explanation of the machine's general operation in conjunction with the timing diagram, Figure 28.

*Ring detector mechanism*

In the previously noted U. S. Patent No. 2,261,420, a starting detector was disclosed which is operable by mechanical vibration of a telephone bell box, a wall type box being illustrated. In the present application the telephone 192 illustrated is of the modern type having the bellbox 202 in the base thereof. For use with this type of instrument, a horizontal plate 203 is provided, this plate partly underlying the base 40 and extending forward therefrom to form a platform for the instrument 192.

A bell-crank 204 is pivoted in the rear end of a slot 205 in the plate 203. The horizontal arm 206 of the bell-crank 204 is urged upward by a spring 207, and the front end of the arm 206 carries a button 208, preferably of insulating material, engaging the bottom of the bell-box 202. The vertical arm 209 of the bell-crank 204 has secured thereto a detector 210, shown in detail in Figures 4 and 5.

Referring to Figures 4 and 5, the detector 210 comprises a cup-shaped insulating casing 211 in which are securely held two vertical strip electrodes 212 and 213. A small triangle 214, suspended from a ring 215, has a weighted cross bar 216 normally engaging the electrodes 212 and 213 so as to maintain an electrical connection between them. Flexible conductors 217 and 218 lead from the electrodes 212 and 213 through the wall of the casing 211, these conductors being connected in a normally closed low-voltage circuit hereinafter described. A bolt 219 secures the casing 211 to the arm 209 and also serves to secure a cover 220 on the casing. The cover 220 is removed in Figure 4.

When the bell-box 202 is vibrated by ringing of the bells therein, the vibrations are transmitted via the button 208 and bell-crank 204 to the casing 211. The resulting horizontal vibrations of the casing cause the swinging bar 216 to "dance" on and away from the electrodes 212 and 213, thus causing a series of breaks in the normally closed detector circuit which start the machine as hereinafter explained.

*Acoustic connections*

Referring to Figures 1 and 2, the front plate 41 has formed thereon or secured thereto a casing 221 in which is resiliently mounted a forwardly directed microphone 222. A resilient liner 223 in the casing 221 terminates at the front in a lip 224 adapted to resiliently support the receiver 225 of the telephone handset 226, the latter being connected in the usual manner with the instrument 192.

The lower casing 151, carrying the loud speaker 152 and previously referred to in connection with Figure 26, is adapted to receive the transmitter 227 of the handset 226, a resilient ring 228 and pad 229 being provided to position the handset out of direct contact with the plate 41 or walls of casing 151.

It is evident that when the telephone is in operation, speech from the receiver 225 is picked up directly by the microphone 222, while sounds emanating from the speaker 152 are projected directly into the transmitter 227.

Adjustable stops 230 terminating in pads 231, Figures 1, 3 and 6, may be provided to assist in properly locating the telephone 192 with respect to the front plate 41 and arm 189.

Referring to Figures 3 and 6, the front plate 41 has secured thereto a pilot light 230, a manually operable volume control or potentiometer 231, a six pole triple throw manual switch 232, a manual turn-off switch 233, and a momentary-contact push-button switch 234. As these devices are of standard construction well known in the art, their electrical parts need be shown herein only diagrammatically in Figure 29. A second potentiometer 235 and a third potentiometer or variable resistor 236 are operable from above the shield plate 165, Figures 3 and 6.

*Electrical apparatus and wiring*

As stated above, the switch 232 is a six-pole, triple throw type—that is, the switch has six simultaneously movable arms each adapted to engage contacts in three separate positions. To promote clarity and avoid undue multiplicity of numbers, the six stages of this switch are generally designated respectively on the diagram, Figure 29, by the numerals 237, 238, 239, 240, 241 and 242, applied to the switch arms, each having three contacts R, A and P. The left-hand contacts R of all stages represent those engaged by the contact arms when the switch 232 is manually set for straight recording. The contacts A are engaged when the device is set for automatic operation, while the P contacts are engaged when the device is set for play-back of previously made recordings.

Further referring to Figure 29, the numerals 243 and 244 indicate feed conductors adapted to be connected to a suitable source of current, the latter in the present case being assumed as the usual 110 volts AC. The conductor 244 is connected to the manual turn-off switch 233, from which a conductor 245 leads to the one terminal of normally closed limit switch 112. The other terminal of switch 233 is connected to four contact arms 246, 247, 248 and 249 of a relay 250, hereinafter termed the main relay. The arms 246 to 249 are respectively adapted to engage normally open contact points 251, 252, 253 and 254, while the arm 249 normally engages a back contact point 255. A branch lead 256 connects the contact point 251 to the line conductor 245 outside the limit switch 112.

A conductor 257 is connected from the common terminal connectors of the arms of main relay 250 to the arm 240 of manual switch 232, a branch 258 also connecting conductor 257 to the arm 239. It is evident that through the described connections, when the main switch 233 is closed, the main relay arms 246 to 249, the conductor 257, and the manual switch arms 239 and 240 all normally carry the potential of line conductor 244.

Leads 259 and 260, respectively, connect the conductors 257 and 243 to the primary coil 261 of a transformer 262 having a low-voltage secondary 263. Since both conductors 257 and 243 are normally charged, the transformer 262 is normally energized.

One side of the secondary 263 is connected via a lead 264 to the magnet 265 of a detector relay 266, the other terminal of the magnet being normally connected via a lead 267, the flexible conductor 218, the detector electrode 213, the bar 216, electrode 212, flexible conductor 217, and a wire 268 with the other side of a secondary 263. The described closed circuit through the detector relay magnet 265 normally keeps the magnet energized with the potential of the secondary 263. The pilot light 230 is bridged directly between secondary wires 264 and 268 and thus normally remains lighted.

The detector relay 266 has a contact arm 269 connected via wires 270 and 260 with the supply conductor 243. A spring 271 is adapted to draw the arm 269 into engagement with a contact point 272, but the energized magnet 265 normally holds this connection open as shown. The contact point 272 is electrically connected to the heater coil 273 of a thermal delay relay 274, the heater coil being further connected via the variable resistor 236 and a wire 275 to the normally closed back contact 255 of the main relay 250.

The thermal delay relay 274 has a bimetallic conducting arm 276 adapted when heated to engage a contact point 277 connected via a lead 278 with the switch arm 239 and thence via the branch 258 to the conductor 257. The heater coil 273, bimetallic arm 276 and contact point 277 are preferably enclosed in an evacuated or gas-filled tube 274ª, Figure 1.

The bimetallic arm 276 is connected via a wire 279 to the manual switch arm 238, thence via a conductor 280 to the normally open contact point 254 of the main relay 250. The push-button switch 234 is cross-connected between the contact point 277 and the wire 279.

The contact point $A_2$ of the manual switch arm 238 is connected via a conductor 281 with the latch magnet 181, the latter having a second lead 282 connected to the supply conductor 243. From the conductor 281, a connection is provided via a wire 283 to the normally closed cam switch 134, through the latter and via a jumper 284 to one terminal of the normally open cam switch 135 and via a branch lead 285 to the magnet 286 of the main relay 250.

From the second terminal of the cam switch 135 a lead 287 is run to one terminal of the magnet 288 of a relay 289, hereinafter referred to as the electronic circuit relay. The second terminal of magnet 288 is connected to the main supply conductor 243. The relay 289 has arms 290 and 291 respectively engaging normally closed contacts 292 and 293, also arms 294 and 295 adapted respectively to engage normally open contacts 297 and 298. A spring 296 normally holds the relay arms in the position shown.

The control motor 115 has a connection on one side via a lead 299 to the supply conductor 243. On the other side, the motor 115 has two connections, one via a wire 300 to the main relay contact 253; the other via wire 301 to one terminal of the normally open cam switch 133, the second terminal of switch 133 being connected via a lead 302 to the conductor 257.

The motor 113, also connected on one side via lead 303 to the supply conductor 243, similarly has two sets of connections from its opposite terminal, one via a wire 304 to one terminal of the cam switch 136 and from the second switch terminal via wire 305 to the conductor 280; the second connection is via a branch 306 to the normally disengaged contacts $R_3$ and $P_3$ of the manual switch arm 239.

The numeral 307 generally denotes a suitable amplifier having main current supply leads 308 and 309 and heater or filament supply leads 310 and 311, the latter connected to the low voltage secondary 263 of the transformer 262. The main current lead 308 is connected to the supply conductor 243, while the second lead 309 is connected to the contact point 252 of main relay 250. From the lead 309 a branch 312 is connected to the normally disengaged contacts $R_4$ and $P_4$ of manual switch arm 240.

The amplifier 307 may be of any suitable type such as that shown in detail in previously mentioned U. S. Patent No. 2,261,420, and since the internal parts and connections of such amplifiers per se form no part of the present invention, these details need not be further described herein. The amplifier 307, as in the case of the above referred to patent, has a main output lead 313, a main input lead 314, and includes an extra stage of amplification for the microphone 222, this stage being provided with auxiliary exterior input and output leads 315 and 316 respectively.

The main output lead 313 is connected to the arms 290 and 294 of the relay 289, while the main input lead 214 is similarly connected to the relay arms 291 and 295.

The auxiliary input lead 315 of course is connected to the microphone 222, while the corresponding auxiliary output lead 316 has two connections, one to the normally disengaged contact $R_5$ of manual switch arm 241, and the other via a branch 317 to the normally open contact point 298 of relay 289.

The pick-up or reproducer 156 also has two connections, one via the potentiometer 231 and a lead 318 to the normally disengaged contact $P_5$ of the manual switch arm 241, the other via the second potentiometer 235 and a lead 319 to the normally engaged contact $A_5$ of the arm 241. The arm 241 is connected by a suitable conductor 320 to the normally closed contact point 293 of relay 288.

The manual switch arm 242 is connected via a conductor 321 to the normally closed contact 292 of the relay 289. Both contacts A₆ and P₆ of the arm 242 are connected via a wire 322 with the loud-speaker 152, while the contact R₆ has a connecting wire 323 to the recorder or cutter head 75. The cutter 75 has a second lead 324 connected to the normally open relay contact point 297.

By examining the above described connection, it will be seen that when the manual switch 232 including the arms 241 and 242 is in A position and the relay 289 de-energized as shown, the device is positioned to direct input from the pick-up 156 via the second potentiometer 235, the lead 319, contact A₅ and arm 241, the conductor 320, the contact point 293, relay arm 291 and main input lead 314 to the amplifier 307. At the same time output current is directed from the amplifier via the main output lead 313, relay arm 290, contact point 292, conductor 321, manual switch arm 242, corresponding contact A₆ and lead 322 to the speaker 152.

When the relay 289 is energized, the described input circuit from the pick-up 156 is broken at relay contact 293, and the main input lead 314 is connected via the relay arm 295, point 298 and conductor 317 with the auxiliary or microphone stage output lead 316. At the same time the arm 290 disengages the contact point 292, thereby breaking the described output to the speaker 152, while an output connection from lead 313 is established via the relay arm 294, contact point 297 and conductor 324 to the cutter 75.

To briefly summarize the above, when the manual switch is set in central or A position, the apparatus is normally set for reproduction, the pick-up 156 being connected to the input 314 and the speaker 152 to the output 313, while the microphone 222 and cutter 75 are disconnected. Energizing the relay 288 disconnects the speaker and pick-up, connects the microphone 222 to the input 314 and connects the output 313 to the cutter, thus setting the apparatus for recording.

The relay 289 being in normal position as shown, if the manual switch 232 is thrown to the left or R position, the electronic circuits are established for straight recording as follows:

The main input lead 314 is connected through the relay arm 291, contact point 293, conductor 320, manual switch arm 241 and contact point R₅ to the microphone stage output lead 316, while the pick-up input connection is broken at A₅. At the same time the cutter 75 is connected via lead 323, contact point R₆, arm 242, conductor 321, contact point 292 and arm 290 to the output lead 313, while the previously described connection is broken at A₆.

When the switch 232, including arms 241 and 242, is thrown to the right into P or playback position, the reproducing connections are the same as those described for normal automatic or A position except that the speaker 152 derives its current via the arm 242 through contact P₆ instead of A₆, while the pick-up connection to the arm 241 passes through the first potentiometer 231, lead 318 and contact P₅ instead of second potentiometer 235, lead 319 and contact A₅. The purpose of providing the two potentiometers 231 and 235 is to allow independent volume control of the automatic or answering reproduction and the manually controlled play-back reproduction.

*Starting circuit operation*

It has been previously set forth how the magnet 265 of detector relay 266 is normally energized by low voltage current from the transformer secondary 263, the detector 210 being included in the described closed circuit. When the telephone 192 rings, the vibrations of the bell-box 202 are transmitted through the bell-crank 204 to the detector 210, and cause the bar 216 to vibrate away from the electrodes 212 and 216, thus breaking the described circuit through the magnet 265. The magnet 265, being de-energized, allows the spring 271 to draw the arm 269 into contact with the point 272.

A circuit is thereby established from the supply conductor 257 through the wires 260 and 270, the arm 269 and contact point 272 to the heater coil 273, thence through variable resistor 236, wire 275, back contact 255 and main relay arm 249 to the normally charged conductor 257. The current passing through the heater coil 273 heats the latter, the heat being transmitted to the bimetallic arm 276 and causing the latter to bend toward the contact point 277. Continued ringing or successive rings of the telephone bell cause cumulative heating and increased bending of the bimetallic arm 276 until the latter engages the contact point 277.

The described engagement closes a circuit from the charged conductor 257 via wires 258 and 278, the contact point 277, the bimetallic arm 276, the wire 279, the manual switch arm 238 and its contact A₂, the conductors 281 and 283, the closed cam switch 134, the jumper 284 and the branch lead 285 to the main relay magnet 286, thence via a wire 325 to the supply conductor 243. The magnet 286 being energized, the relay 250 is actuated, all its arms being thrown to operative position.

The arm 249 engages the contact point 255, thereby closing a second connection from charged conductor 257 via arm 249, point 254, and conductor 280 to the manual switch arm 238, then through the previously traced path to the relay magnet 286. The last described circuit thus constitutes a holding circuit adapted to keep the magnet 286 energized after the initial contact in thermal relay 274 has broken. This latter contact is broken shortly after the relay 250 is actuated, since when the arm 249 moves into engagement with point 254 it disengages the back contact 255, thus breaking the described circuit of heater coil 271 and allowing the bimetallic arm 276 to return to normal position clear of its contact point 277.

It will be evident that the latch magnet 181 is also energized by the initial contact and is also maintained energized so long as the described holding circuit persists.

When it is desired to start the device through its automatic cycle independently of the telephone, for example in order to record a talk-out or answering speech as hereinafter set forth, the push-button switch 234 may be closed. Since this switch is connected in parallel to the thermal relay 274, its closure energizes the relay 286 through the circuits already described.

It will be noted that both the initial energizing current to main relay magnet 286 and latch magnet 181 and the subsequent holding current pass through the manual switch 238 and its contact A₂, while the contacts R₂ and P₂ are blank. Therefore, if the manual switch 232 is shifted either to R (straight recording) or P (playback)

position, the described connections to the magnet 286 and latch 181 are broken between the arm 238 and its contact A₂, so that during straight recording or playback neither the main relay 250 nor the latch magnet 181 can be energized.

It will be further noted that a branch wire 326 is connected from the detector magnet lead 267 to the contacts R₁ and P₁ of manual switch arm 237, the arm itself being connected via a wire 327 with the transformer secondary 263. By this means, when the switch 232 is turned either to straight recording or playback position, a connection is established around the detector 210, the closed low voltage circuit being maintained through the detector relay magnet 265 independently of the detector 210.

During the straight recording or playback, the above described provisions make it impossible for the machine to be started through its automatic cycle either by ringing of the telephone or by accidental closure of the push-button switch 234.

*Automatic cycle circuits*

When the main relay 250 has been actuated by the starting circuit as described above, closure of the arm 247 on the contact point 252 completes a main current connection from the conductor 245 via the limit switch 112, the arm 247, the point 252 and lead 309 to the amplifier 307, and as the latter is already connected via lead 308 with the second supply conductor 243, the amplifier 307 is energized.

Similarly, closure of relay arm 248 on contact 253 directs current from conductor 245 via the lead 300 to the motor 115, the latter's circuit being completed via lead 299 to the supply conductor 243.

The motor 115 revolves the turntable 49 and cam shaft 121 and with the latter the various previously described cams. Immediately after starting, as shown in the timing diagram, Figure 28, the cam 129 closes the switch 133, thus completing a connection via wire 302, switch 133 and lead 301 to the motor 115, this connection being parallel to the previously described connection through the main relay 250. It will be seen from the contour of the cam 129, that once the switch 133 has been closed it is held closed until the cam 129 completes its revolution. This assures a supply circuit to the motor 115 independently of the relay 250.

In case of a failure of current supply during the automatic operation of the device, the relay 250 drops out, the latch magnet 181 releases its armature 182 to allow the control arm 189 to drop and "hang up" the telephone, and, of course, the motor 115 stops part-way through the cycle. Upon restoration of supply current, the relay 250 normally remains de-energized so that no current is directed therethrough to the latch magnet 181, the amplifier 307 or the motor 115. However, due to the fact that the switch 133 is closed, the latter supplies current to motor 115 through the above described parallel connections, causing the motor to complete the rotation of the cams, thus resetting the device to normal starting position as above.

It will be understood that the above running of the motor 115 for resetting occurs only following an interruption of current. During a normal cyclic operation, the main relay 250 remains closed until just before the end of the cycle, when the cam 130 allows the switch 134 to open momentarily, thus breaking the previously described holding circuit to the magnet 286 and causing the main relay to drop out.

At a point prior to the half-way time of the normal cycle, as shown by the timing diagram, Figure 28, the cam 132 allows the switch 136 to close, directing line current from the relay arm 249 via contact point 254, conductor 280, wire 305, switch 136 and wire 304 to the recorder motor 113, thence via lead 303 to the supply conductor 243. The motor 113 starts, driving the turntable 50 and the previously described feed mechanism. Immediately after the closure of switch 136, the cam 132 allows the signal lever toe 147 to drop, thus causing the clapper 149 to strike the gong bar, Figure 26, and sound a signal.

Immediately following the signal, the cam 131 allows the switch 135 to close. It has already been shown that the jumper 284 throughout the cycle is charged with the potential of supply conductor 245 via the holding circuit of main relay 250. Closure of switch 135, therefore directs current from jumper 284 via wire 287 to the magnet 288 of the electronic control relay 289, thence to the second supply conductor 243. The relay 289 is actuated, disconnecting the pick-up 156 and speaker 152 while connecting the cutter 75 and microphone 222 in the manner previously described. The relay 289 remains energized to maintain the apparatus in recording connection until the switch 134 opens near the end of the cycle as set forth above. As the cycle ends, the switches 135 and 136 are again opened by their respective cams 131 and 132.

*Recording talk-out or answering speech*

In order to prepare a talk-out record, the operator swings the phone control arm 189 up into the position shown in Figure 6, removes the handset 226 from the housings 221 and 151 and places it in its usual position on the cradle switch 191. The pick-up arm 154 is moved to the notch 170 in arm 158, Figure 27, the reproducer being thus held clear of the turntable 49 as illustrated in Figure 6. A record blank 93 is placed on the table 49, the recorder arm 72 is swung until the latch 102 enters the notch 107, Figure 21, and the trigger 100 is pulled, allowing the forks 89 to engage the feed hub 59 as previously set forth. The recorder arm 72 is thereby located as shown in Figure 6 in feeding engagement, the pin 198, Figure 19, holding the cutter head 75 elevated so that the stylus 80 is poised above the boundary C of the recording zone on blank 93.

The operator then closes the push-button switch 234, starting the machine through its cycle by the connections previously explained in connection with Figure 29.

During the first part of the cycle which normally would comprise the answering period, Figure 28, the machine idles, since the reproducer 156 is not in registry with the turn-table 49. Near the end of this period, the cam switches 136 and 135 close, as previously explained, starting the recorder motor 113 and actuating the relay 289. The device is thereby electrically conditioned for recording and the recorder feed begins. Next the pin 198 lowers the cutter head 75 under control of the cam 128 and lever 127, Figures 1 and 20, to place the stylus 80 on the blank 93, where it starts cutting its spiral groove.

After a few leading or idle grooves have been cut, the indicator 143 starts upward, whereupon the operator speaks his desired answering message into the microphone housing 221, timing his speech by the progress of the indicator up the scale 144 and preferably ending substantially at the top of the indicator's travel. A typical speech may be as follows: "Mr. Blank is not in his office, but this automatic recorder will take any short message you may wish to leave and will repeat it to him when he returns. Give your name and telephone number if you wish to be called back. Start your message when you hear the gong signal."

By cooperation of the microphone 22, amplifier 307 and the cutter 75 in the usual manner, the spoken message is recorded in the zone C—D on record 93. After the completion of the talk-out recording period, as shown in Figure 28, the switches 134 and 133 open to end the cycle in the manner previously set forth, the cutter control pin 198 meanwhile again raising the stylus 80 from the record 93.

The operator raises the recorder arm 72 and swings it back to normal recording position above the turn-table 40, and replaces the reproducer arm 154 with its roller 169 in the control notch 168, Figure 27. If he wishes he may again push the button-switch 234 to initiate a cycle for testing his recorded speech. During the "answering" period, the pick-up 156 having been lowered by arm 158 into registry with the recorded zone C—D, the recorded speech is reproduced through the speaker 152. If desirable the initial registry of the needle 157 with the zone C—D may be adjusted by means of the knob 162 as previously explained. Also the loudness of the talk-out speech may be adjusted by means of the potentiometer 235.

The reason for the provision of the cutter control pin 198, Figures 19 and 20, appears during examination of the above talk-out recording procedure. The recording occurs on the small record 93 on turn-table 49, but the feed of the cutter head 75 is furnished through the described mechanism operated by recording motor 113. The turn-table 49, driven by motor 115, revolves throughout the entire cycle, but the motor 113 runs only during the recording period, Figure 28. Therefore, if the stylus 80 were placed in engagement with blank 93 initially, it would cut the latter without feeding during the first part of the cycle, resulting in injury to both stylus and record. With the present arrangement, the pin 198 prevents such injury by keeping the cutter elevated until after the motor 113 and consequently the feed has started.

*Automatic message recording*

The talk-out message having been recorded on record 93 as set forth above, the operator places a record blank 92 on the table 50, swings the recorder arm 72 until the latch 102 drops in the notch 106, Figure 21, and trips the trigger 100 to lower the arm 72 into feeding position as previously explained, the stylus 80 engaging the starting boundary K of the recording zone K—B. He next places the hand-set 226 with the receiver 225 and transmitter 227 respectively in the housings 221 and 151, and lowers the control arm 189 so that its weighted end portion 190 depresses the cradle switch 191, the latter being thereby held in open or "hung-up" condition.

When the telephone rings, the vibrations of the bell-box 202 actuate the detector 210, energizing the thermal relay 274 in the manner set forth until after sufficient ringing, as determined by the setting of the variable resistor 236, the relay 274 closes to start the cycle. The cam 123 acts through the roller 175 and related mechanism to raise the arm 189, thus allowing the switch 191 to connect the telephone. The cam 158 lowers the pick-up 156 into cooperation with the record 93, and the previously recorded talk-out message is spoken by the speaker 152 into the transmitter 227 during the "answering" period, Figure 28.

At the close of the "answering" period, the recorder motor 113 starts, the gong signal sounds, and the relay 289 switches the apparatus from reproducing to recording condition. Thereafter, during the message recording period, Figure 28, any message emanating from the receiver 225 is picked up by the microphone 222, transmitted through the amplifier 307 and recorded by the cutter 75 on the blank 92. Meanwhile, the pick-up 156 is raised and returned to initial position. At the conclusion of the message recording period, the main relay 250 drops out, the latch 181 releases to drop the arm 189 and "hang up" the phone, and the motor 113 stops after driving the device to initial position ready to receive the next message.

At the conclusion of recording the incoming message the cutter stylus 80 remains in engagement with the record 92, so that the next incoming message recording "tracks" directly from the end of the preceding recording. An ordinary recording blank contains sufficient area to provide for an ample number of successive messages under usual circumstances. If for any reason the messages accumulate until the cutter stylus 80 approaches the inner boundary B of the zone K—B, the latch 102 opens the limit switch 112 in the manner explained in connection with Figure 21.

During automatic operation, the opening of the limit switch 112 does not break the operating circuit, since a connection around the switch 112 is provided by wire 256, point 251 and main relay arm 246, Figure 29. At the conclusion of the cycle, however, when the relay 250 drops out, the current supply from conductor 245 is opened by the relay, and since the limit switch is already open, the main supply remains shut off until the recorder arm 72 is raised to allow the limit switch 112 to re-close.

From the foregoing, it will be seen that while the limit switch 112 prevents over-running the permissible recording zone, the parallel connection through the relay 250 prevents interruption of the last recorded message. Sufficient reserve space is provided in the zone Z—B to allow for completion of any message during which the limit switch is operated.

*Play-back*

When it is desired to reproduce the messages recorded on the record 92, the operator first removes the hand-set 226 from the housings 221 and 151, lifts the recorder arm 72 to disengage the recorder from the record and also disengage the described feed mechanism, and turns the manual switch 232 to P or play-back position. By this switching operation, the previously described automatic control circuit is disabled between arm 258 and its contact A₂, Figure 29, and the described low-voltage bridging circuit around the detector 210 is established between arm 237 and contact P₁. The arm 239 engages its contact P₃, directing current from the normally charged conductor 257 via wire 258, arm 239, contact P₃ and branch 306 to the motor 113, thence via lead 303 to conductor 243. The motor 113 is thereby started to drive the turn-table 50.

Similarly, the manual switch arm 240 engages its contact P4, directing main supply current from conductor 257 via branch 312 and conductor 309 to the amplifier 307, thence via lead 308 to the second supply conductor 243, thus energizing the amplifier. Arms 241 and 242 by engaging contacts P5 and P6, connect the pick-up 156 and speaker 152 respectively to the input 314 and output 313 of the amplifier in the manner previously set forth.

The above described connections energize the apparatus as a straight reproducing phonograph. The operator raises the reproducer arm 154 clear of the arm 158, swings it above the record 92 as shown in dot-and-dash lines, Figure 1, and plays back the recordings on record 92 in the usual manner through the speaker 152. The volume of play-back sound may be varied by means of the potentiometer 231.

Straight recording

At times it may be desired to utilize the device for straight manually controlled recording, for example for dictation of short letters, dictation of office instructions and the like. To accomplish this purpose, the operator places a record blank on the table 50, sets the recorder arm 72 in initial recording position as previously described, and turns the manual switch 232 "R" position. The arms 239 and 237, Figure 29, disable the starting and automatic cycle circuits in substantially the same manner as described for play-back, while the arms 239 and 240 by engaging their contacts R3 and R4 similarly start the motor 113 and energize the amplifier 307. At the same time, the arms 241 and 242 by engaging their contacts R5 and R6 operate through previously described connections to respectively connect the microphone 222 to the input 314 and the cutter 75 to the output 313 of the amplifier.

The device thus being rendered operative as a direct recorder, the operator by speaking into the microphone housing 221 may record on the blank 92 for any length of time within the capacity of the record. In case recording approaches the permissible inner limit of the zone K—B, the limit switch 112 is opened, and since the relay 250 is also open, the machine is deenergized at once.

In some cases only a portion of the zone K—B may have been used for recording, either automatic or manually controlled, and it is desired to utilize the remainder after playing back the already recorded portion. In this case, the operator in disengaging the recorder merely lifts the arm 72 to disengage the feed mechanism, but does not swing the arm circumferentially. The arm 72 thus remains poised on the latch 102 with the stylus 80 directly above the line of last recording. After play-back of the recorded portion, when the trigger 100 is again operated to release the latch 102 and lower the arm 72, the stylus 80 automatically re-engages the partially recorded blank exactly at the inner limit of the previous recording. All the available space may thus readily be utilized in a substantially continuous recording band. It is evident that this result is due to the advantageous feed structure of the present invention, wherein feed engagement may be made with any point in the circumference of the feed hub 59, without the difficulties of attempting to match and mesh feed screws or teeth as in the usual forms of feed structure.

It will be apparent to those skilled in the art that the above and other advantages of the described recording and reproducing apparatus make these structures well suited per se to function in various reproducing and recording devices other than the telephone message recorder forming part of the present invention. While these and other features of the invention have been set forth in preferred form, they are not limited to the precise structures illustrated, as various modifications may be made without departing from the scope of the appended claims.

What is claimed is:

1. In a telephone answering device operable by electricity, in combination, a casing, means including a vibratory switch to initiate operation of said device movably mounted in said casing, and a member connected to said switch and extending outward from said casing, said member being adapted to engage the bell-box of a telephone and transmit the ringing vibrations of said box to said switch.

2. In a device of the character described, in combination, a bell-crank having a substantially horizontal arm and a substantially vertical arm, means to pivotally support said bell-crank, a switch operable by vibration on said vertical arm, and means on said horizontal arm adapted to vertically engage a telephone bell casing whereby vibrations of said casing may actuate said switch.

3. In a detector device for cooperation with a telephone instrument having a bell mounted in the base thereof, in combination, means to support said telephone instrument, a lever pivotally secured to said support and adapted to extend under said base and engage the same, and a vibratory switch operatively connected to said lever.

4. In combination, a record blank adapted to receive sound recordings, a recorder and a supporting arm therefor supported adjacent said record blank, manually operable means for lowering said arm toward said record to bring said recorder into an intermediate position adjacent to but out of contact with said record blank, supporting means for holding said arm in said intermediate position, and means for withdrawing said supporting means to permit said recorder to contact said blank.

5. In combination, a record blank adapted to receive sound recordings, a recorder and a supporting arm therefor supported adjacent said record blank, manually operable means for lowering said arm toward said record to bring said recorder into an intermediate position adjacent to but out of contact with said record blank, supporting means for said arm in said intermediate position, means for withdrawing said supporting means to permit said recorder to contact said blank, a second record blank, said recorder arm being movable to a recording position over said second blank and said recorder on said arm being engagable with said second blank by said manually operable means.

6. In a recording device, a record blank, means for recording sound thereon, a motor for relatively moving said blank and means, reduction gearing driven by said motor, and an arm operated by said gearing to be moved thereby to indicate the relative position of said blank and recording means.

7. The combination as claimed in claim 6 wherein a fixed scale is provided across which said arm moves to indicate the recorded area on said record.

8. The combination as claimed in claim 6 wherein a fixed scale is provided below the plane of the record and said arm traverses said scale to indicate the recorded area on said record.

9. In a device of the character described, a cabinet containing a telephone answering device, an adjustable stop extending from said cabinet for positioning a telephone instrument adjacent thereto, and means extending from said cabinet adapted to contact a telephone instrument and to be operated thereby to initiate the operation of said telephone answering device.

10. In a device of the character described, a cabinet containing a telephone answering device, an arm extending therefrom and adapted to engage a telephone switch, a stop subjacent said arm adapted to position a telephone instrument relative to said arm, and signal receiving means extending from said cabinet subjacent said stop and adapted to contact a telephone instrument.

11. In a device of the character described, a record blank, means for recording sound thereon, driving means for moving said record, means for observing the duration of a recording operated by said driving means, and means for reproducing said recording over a telephone circuit.

12. In a device of the character described, a cabinet having an aperture therein, a record blank, means for recording sound thereon, driving means for said record enclosed in said cabinet, means for observing the duration of a recording including visual indicating means cooperating with said aperture, and means for reproducing said recording over a telephone circuit.

13. In a device of the character described, a telephone answering device having a plate extending therefrom adapted to support a telephone instrument, a switch arm extending from said device and adapted to operate the switch of a telephone instrument when same is positioned on said plate, and means carried by said plate adapted to transmit ringing signals from a telephone on said plate to said device to initiate the operation thereof.

14. In a device of the character described, two record tables, a reproducer arm, a reproducer carried by said arm, said arm adapted to carry said reproducer in a reproducing path across both said tables, said path being on the same side of a median line extending through the centers of said tables.

15. In a device of the character described, two record tables, a reproducer arm, a reproducer carried by said arm, said arm adapted to carry said reproducer in a reproducing path across both said tables, said path being on one side of a median line through the centers of said tables, a recording arm, a recorder carried by said arm, said arm adapted to carry said reproducer in a recording path across both said tables, said path being on the opposite side of said median line from said reproducing path, and means for rotating said tables.

16. In a device of the character described, two record tables, a reproducer arm, a reproducer carried by said arm, said arm adapted to carry said reproducer in a reproducing path across both said tables, said path being on one side of a median line through the centers of said tables, a recording arm, a recorder carried by said arm, said arm adapted to carry said recorder in a recording path across both said tables, said recording path being on the opposite side of said median line from said reproducing path, and means for moving said recording arm across said tables to form a recording on record blanks carried thereby.

17. In a telephone answering device operable by electricity, in combination, means including a vibratory switch to initiate operation of said device, said switch being movably mounted in said casing, and a member connected to said switch and extending outward from said casing, said member being adapted to engage the bellbox of a telephone and transmit the ringing vibrations of said box to said switch.

18. In a device of the character described, in combination, a bell-crank having a substantially horizontal arm and a substantially vertical arm, means to pivotally support said bell-crank, a switch operable by vibration on said vertical arm, and means on said horizontal arm adapted to vertically engage a telephone bell casing whereby vibrations of said casing may actuate said switch.

19. In a detector device for cooperation with a telephone instrument having a bell mounted in the base thereof, in combination, means to support said telephone instrument, a lever pivotally secured to said support and adapted to extend under said base and having an end member adapted to engage the bottom of said base, and a vibratory switch operatively connected to said lever.

20. In a device of the character described, in combination, two turntables in substantially the same plane and adapted to hold record blanks, a recorder adapted to selectively engage said blanks, a reproducer adapted to selectively engage said blanks, means to selectively drive said tables, means to feed said recorder across said blanks to record thereon, an amplifier, and switching means for sequentially connecting said amplifier to said recorder and reproducer.

21. The combination as claimed in claim 20 wherein the feeding means for the recorder includes an electric motor and source of current therefor and wherein said amplifier is operated by said source of current.

22. In an apparatus of the class described the combination of a support, two turntables revolvably mounted on said support and having their surfaces in substantially the same horizontal plane, motor means for driving said turntables carried on said support subjacent the tables, means for selectively and sequentially operating said tables by said motor means, a sound record on one of said tables, a reproducer, means operated by said motor means for sequentially causing said reproducer to engage and disengage said sound record to reproduce sound recorded thereon, a record blank on the other of said tables, a recorder, means operated by said motor means for causing said recorder to traverse said record blank to record sound thereon, switching means operated by said motor means for completing electrical circuits including said reproducer when same is in contact with said sound record and to disconnect the same and connect said recorder when same is in contact with said record blank, means for coupling said reproducer to the transmitter of a telephone instrument, and means for coupling said recorder to the receiver of said instrument.

23. In an apparatus of the class described the combination of a support, two turntables revolvably mounted on said support and having their surfaces in substantially the same horizontal plane, motor means for driving said turntables carried on said support subjacent the tables, means for selectively and sequentially operating said tables by said motor means, a sound record on one of said tables, a reproducer, means operated by said motor means for sequentially causing said reproducer to engage and disengage said sound record to reproduce sound recorded thereon, a record blank on the other of said tables, a recorder, means operated by said motor means for causing said recorder to traverse said record blank to record sound thereon, switching means operated by said motor means for completing electrical circuits including said reproducer when same is in contact with said sound record and to disconnect the same and connect said recorder when same is in contact with said record blank, a circuit connected to said motor means, and means in said circuit adapted to be actuated by a telephone ringer for closing the motor circuit to start the motor.

24. In a device of the character described, the combination of a mounting plate, recording and reproducing mechanism including movable records carried thereby, the recording and reproducing records being mounted above said plate, driving means for said mechanism mounted below said plate, said recording mechanism including a recorder adapted to record sound on a record, said recorder being mounted above said plate and means for driving same below said plate and said reproducing mechanism including a reproducer adapted to reproduce sound from a record, said reproducer mounted above said plate and means for causing said reproducer to engage and disengage the sound record mounted below said plate, means for connecting a telephone transmitter and receiver to said recording and reproducing mechanism whereby incoming speech over said receiver may be recorded by said recording mechanism and said reproducing mechanism may transmit speech outwardly via said transmitter, and means operated by said driving means for first connecting said reproducer mechanism to said transmitter for operation thereover, secondly to disconnect said reproducer mechanism from said transmitter and to connect said recording mechanism to said receiver to record incoming speech therefrom, and thirdly to disconnect said recording mechanism from said transmitter and receiver and stop the movement of said records.

JOHN J. SHIVELY.
HARRY R. VAN DEVENTER.